(12) United States Patent
Cammarata et al.

(10) Patent No.: US 11,515,722 B2
(45) Date of Patent: Nov. 29, 2022

(54) REDUNDANT POWER MANAGEMENT FOR MODULAR IVD ANALYZER VESSEL MOVER SUBSYSTEM

(71) Applicant: Siemens Healthcare Diagnostics Inc., Tarrytown, NY (US)

(72) Inventors: Charles V. Cammarata, Ledgewood, NJ (US); Thomas J. Bao, Livingston, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 909 days.

(21) Appl. No.: 16/319,223

(22) PCT Filed: Jul. 19, 2017

(86) PCT No.: PCT/US2017/042906
§ 371 (c)(1),
(2) Date: Jan. 18, 2019

(87) PCT Pub. No.: WO2018/017744
PCT Pub. Date: Jan. 25, 2018

(65) Prior Publication Data
US 2019/0252910 A1    Aug. 15, 2019

Related U.S. Application Data

(60) Provisional application No. 62/365,194, filed on Jul. 21, 2016.

(51) Int. Cl.
*H02J 9/06* (2006.01)
*H02J 1/10* (2006.01)
(Continued)

(52) U.S. Cl.
CPC .............. *H02J 9/061* (2013.01); *G01N 35/04* (2013.01); *H02J 1/10* (2013.01); *H02J 3/0073* (2020.01);
(Continued)

(58) Field of Classification Search
CPC .. H02J 9/061; H02J 3/0073; H02J 1/10; H02J 3/00; H02J 9/06; G01N 35/04;
(Continued)

(56) References Cited

U.S. PATENT DOCUMENTS 4,613,805 A * 9/1986 Matsuo ................. B65G 54/02
307/64
6,331,437 B1 12/2001 Cohen et al.
(Continued)

FOREIGN PATENT DOCUMENTS

CN       101002099 A      7/2007
CN       102069726 A  *  5/2011
(Continued)

OTHER PUBLICATIONS

Extended EP Search Report dated Jun. 24, 2019 of corresponding European Application No. 17831810.1, 4 Pages.
(Continued)

*Primary Examiner* — Bickey Dhakal

(57) ABSTRACT

A modular in vitro diagnostics (IVD) vessel mover system providing redundant power management includes a plurality of modules which are configured to provide storage to one or more IVD samples. Each module comprising a power failover switch which is configured to receive internal power from an internal primary power source and transmit backup power to one or more of the plurality of modules.

11 Claims, 3 Drawing Sheets

(51) Int. Cl.
*H02J 3/00* (2006.01)
*G01N 35/04* (2006.01)
*H02P 6/00* (2016.01)

(52) U.S. Cl.
CPC ...... *H02P 6/006* (2013.01); *G01N 2035/0475* (2013.01); *G01N 2035/0477* (2013.01)

(58) Field of Classification Search
CPC .... G01N 2035/0475; G01N 2035/0477; H02P 6/006; Y02T 10/70; B61B 13/02; B61B 13/08; B61B 13/12; B60K 1/04; G01R 33/465; H03L 5/02; B65G 54/02; B60L 50/50
See application file for complete search history.

(56) References Cited

U.S. PATENT DOCUMENTS

| | | | |
|---|---|---|---|
| 2012/0247925 A1* | 10/2012 | Cooke | B65G 43/00 198/619 |
| 2013/0257159 A1 | 10/2013 | Wang et al. | |
| 2014/0305227 A1 | 10/2014 | Johns | |
| 2014/0373747 A1* | 12/2014 | Yagci | B61C 3/02 320/108 |
| 2015/0369832 A1 | 12/2015 | Sacco | |

FOREIGN PATENT DOCUMENTS

| | | |
|---|---|---|
| CN | 104823345 A | 8/2015 |
| CN | 105277530 A | 1/2016 |
| JP | S60-229603 A | 11/1985 |
| JP | H11-308783 A | 11/1999 |
| JP | 2011-013112 A | 1/2011 |
| JP | 2014-002054 A | 1/2014 |
| JP | 2015-040768 A | 3/2015 |
| JP | 2015-518187 A | 6/2015 |
| KR | 2016-0056196 A | 5/2016 |
| WO | 2012158520 A1 | 11/2012 |
| WO | 2013/116651 A1 | 8/2013 |
| WO | 20130149117 A2 | 10/2013 |
| WO | 20130151920 A1 | 10/2013 |
| WO | 2014/112259 A1 | 7/2014 |

OTHER PUBLICATIONS

PCT International Search Report and Written Opinion dated Nov. 16, 2017 (11 Pages).

* cited by examiner

REDUNDANT POWER MANAGEMENT FOR MODULAR IVD ANALYZER VESSEL MOVER SUBSYSTEM

CROSS-REFERENCE TO RELATED APPLICATIONS

This application claims the benefit of U.S. Provisional Application Ser. No. 62/365,194 filed Jul. 21, 2016, which is incorporated herein by reference in its entirety.

TECHNICAL FIELD

The present disclosure relates generally to methods, systems, and apparatuses related to power management for a modular in vitro-diagnostic (IVD) analyzer vessel mover subsystem.

BACKGROUND

In vitro-diagnostic (IVD) testing systems utilize a vessel mover subsystem that moves vessels containing test samples between different testing stations. Because the vessel mover subsystem is a core component of the overall testing system, it is important that it maintains an adequate supply of power at all times, even while other instrument modules in the subsystem may be in an inoperative or de-energized state. Moreover, the system has a goal of minimizing the overall unscheduled visit rate (USVR) to ensure that reliability goals are met. Thus, it is important that the vessel mover subsystem remains highly available throughout testing operations.

Power supplies are a common source of failure for systems, generally. Thus, using a single power supply greatly increases the chance that the vessel mover's subsystem will exceed its target USVR. As a result, designers of vessel mover systems have struggled to design power systems that help minimize the risk of failure. In some conventional solutions, each segment is powered independently, with some level of N+1 redundant AC-DC power supply system in each segment. Alternatively, derating of power supplies is a conventional method of decreasing its USVR by increasing the service life of a power supply under a given load condition. Derating typically requires implementing a power supply with proportionally higher rated output capacity with respect to its expected load condition. Although these generally address the problem of power source failure, the redundancy and or derating expands the overall footprint of the system being powered. Thus, this solution cannot be applied in systems where the available footprint is limited or other space constraints exist. In other conventional solutions, a central power supply is implemented, with an N+1 redundant AC-DC power supply system or derated single supply. This would also solve the problem, but was not favorable due to the difficulty in scalability and challenges with power distribution. A large power supply would likely be needed, based on a worst case number of expected segments.

Accordingly, it is desired to provide redundant power management for modular IVD analyzer vessel mover subsystems.

SUMMARY

Embodiments of the present invention address and overcome one or more of the above shortcomings and drawbacks by providing methods, systems, and apparatuses related to power management for a modular in vitro-diagnostic (IVD) analyzer vessel mover subsystem. Briefly, the vessel mover subsystem comprises a plurality of modules that each include a primary power source and a power failover switch (PFS). The PFS is used to link power sources together across the modules in a manner that provides redundancy in the event that any individual module fails.

According to some embodiments, an IVD vessel mover system provides redundant power management using a plurality of modules configured to provide storage to one or more IVD samples. Each module comprises a PFS that is configured to receive internal power from an internal primary power source, and transmit backup power to one or more of the other modules included in the plurality of modules.

The aforementioned plurality of modules may be divided into a central module and one or more non-central modules. In addition to the general PFS functionality described above, the PFS of the central module may be further configured to receive additional internal power from an internal independent backup power source within the central module. Additionally, the central module may include a port coupled to the internal independent backup power source, which is configured to transmit power to a non-central module without utilizing the PFS of the central module. Under normal operating conditions, the central module utilizes power received from the internal primary power source of the central module to perform one or more powered functions in the central module (e.g., operating a cooling unit, operating a transportation module, etc.). If a power fault condition in the internal primary power source is detected, the central module may switch to the internal independent backup power source to perform the powered functions. Then, after detecting that the internal primary power source has ended, the central module may switch back to the primary power source to perform the power functions.

To provide redundancy, the non-central modules may be further configured to receive backup power from one or more of the other modules. Similar to the central module, the non-central module may utilize power received from the internal primary power source of the non-central module to perform one or more powered functions in the non-central module (operating a cooling unit, operating a transportation unit, etc.). However, in contrast to the central module, when a power fault condition in the internal primary power source is detected, the non-central module may switch to utilization of the backup power received from the other module(s) to perform its powered functions. Then, once the non-central module detects that the power fault condition in the primary power source has ended, it may switch back to the primary power source to perform the powered functions.

According to another aspect of the present invention, a modular IVD vessel mover system providing redundant power management includes a track and a plurality of modules (e.g., analyzer modules, sample handlers, etc.). The track includes linear synchronous motors divided into regions. Each module is configured to provide power to a subset of the linear synchronous motors corresponding to a region the track via a power failover switch using a power source located in the module. Upon detecting failure of the local power source, the modules provide power to the subset of the linear synchronous motors via the power failover switch using a power source in a second module included in the modules. In some embodiments, the second module provides power to second subset of linear synchronous motors that is adjacent to the subset of the linear synchronous motors on the track.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to redundant power management, which may be utilized in a modular in vitro diagnostics (IVD) analyzer vessel mover sub-system. Briefly, a vessel mover subsystem designed using the techniques described herein comprises a set of storage and transportation modules that each include a power failover switch (PFS). The PFS allows the module to switch between a primary power source and a backup power source in a seamless manner. The centralized power supply approach described herein allows for reduced cabling, reduced cost, and is fully scalable. Additionally, because each segment includes its own power supply, space may be reduced and the presence of hazardous voltage levels within the vessel mover segment (which could require safety mitigations) is avoided.

Figure 1:
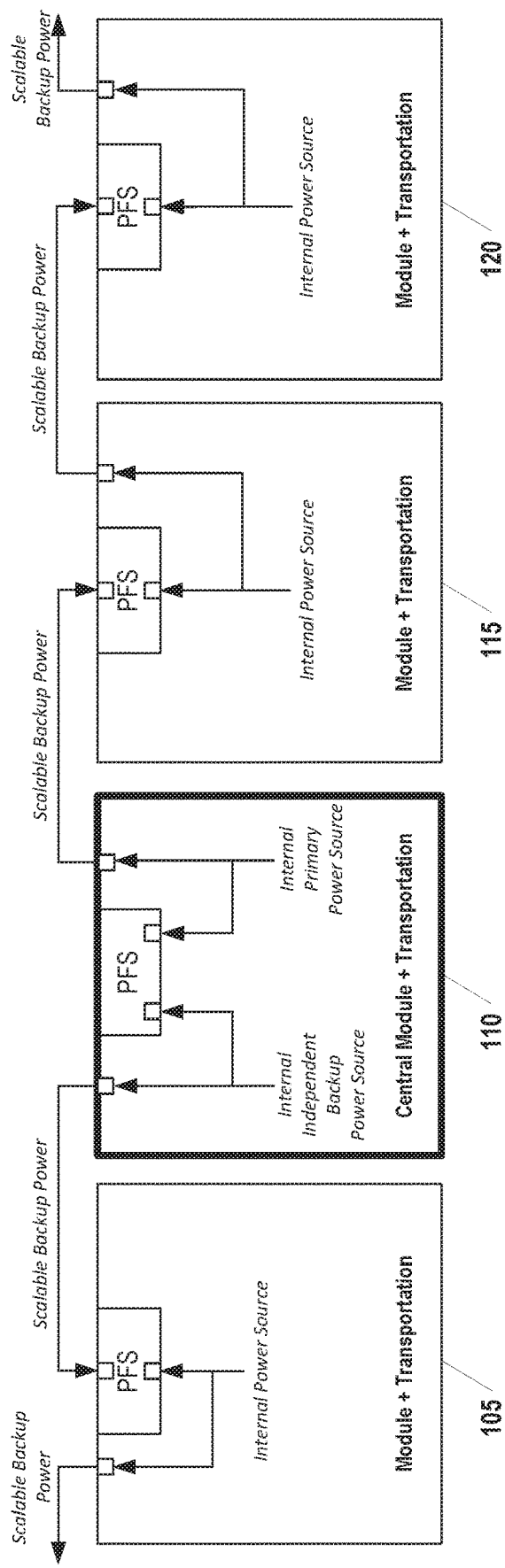
FIG. 1 illustrates an example of a modular in vitro diagnostics vessel mover system that provides redundant power management, according to some embodiments of the present invention.

FIG. 1 illustrates an example of a modular in vitro diagnostics vessel mover subsystem 100 that provides redundant power management, according to some embodiments of the present invention. The vessel mover subsystem 100 comprises four modules 105, 110, 115, 120 that each provides storage and transport functionality for test samples. Each module 105, 110, 115, 120 comprises a PFS that includes a power monitoring and switchover circuit that continuously monitors the primary power source within the respective module, and seamlessly switches to a secondary power, as necessary.

In some embodiments, the power failover feature utilizes the existing direct current (DC) power supply contained in the vessel mover segment's associated instrument module as a primary power source under normal conditions. The power failover feature may also utilize the existing DC power supply contained in the vessel mover segment's adjacent instrument module as a secondary power source under fault conditions. The power failover technical feature can continuously monitor the primary power source, and seamlessly switch to a secondary power source in the event of a detected power fault condition in the primary, and seamlessly switches back to the primary power source when the fault condition no longer exists. Each instrument module typically has power supply operational margin for reliability reasons; this margin can be utilized under temporary fault conditions without significantly compromising its long term reliability. This topology may be inherently scaled with each vessel mover segment and associated instrument module.

Using the vessel mover subsystem 100 shown in FIG. 1, field service personnel can power down any instrument module without disrupting other functions of the system, meaning IVD tests being carried out on other instrument modules can proceed since the entire vessel mover is still in operation. The same holds true if the power system of any single instrument module should fail. This allows the customer to continue to process IVD tests.

As an alternative to the vessel mover subsystem 100 shown in FIG. 1, in some embodiments, each vessel segment is powered directly from a separate AC power source, and a high-reliability type AC-DC power supply is selected in lieu of N+1 redundancy. This may be cost comparable to the vessel mover subsystem 100. However, it will require additional space allocation and presents hazardous voltage potentials within the vessel mover segment (which requires additional risk mitigations).

Figure 2:
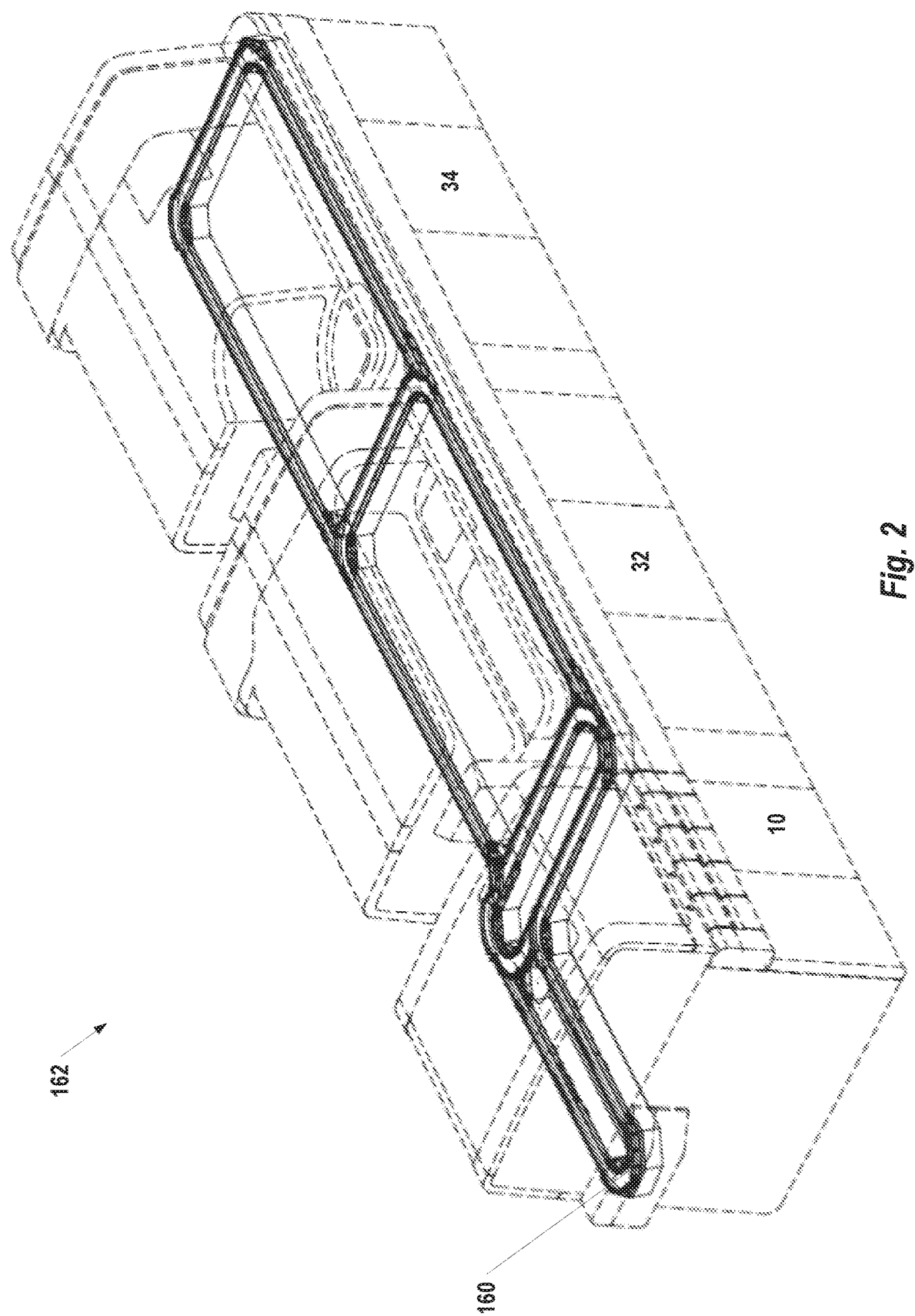
FIG. 2 shows track system situated in a fully operational analyzer system that includes a sample handler module and two analyzer modules, according to some embodiments.

To illustrate the present invention, as it may be implemented in some embodiments, FIG. 2 shows track system 160 situated in a fully operational analyzer system 162 that includes a sample handler module 10 and two analyzer modules of 32 and 34. In some embodiments, this track is made up of stainless steel channels that include guide rails in the walls and a flat floor. Carriers include a low friction material, such as Ultra-high-molecular-weight polyethylene (UHMW), Teflon, or other suitable materials on the bottom of each carrier. This bottom material allows the carrier is to glide along the flat track, guided by guide rails in the walls. Underneath the metal surface of the track, a series of magnetic coils forming linear synchronous motors (LSMs). Meanwhile, a plurality of rare earth magnets in each carrier responds to changes in these coils, by moving the carrier synchronously with changes in those coils.

Figure 3:
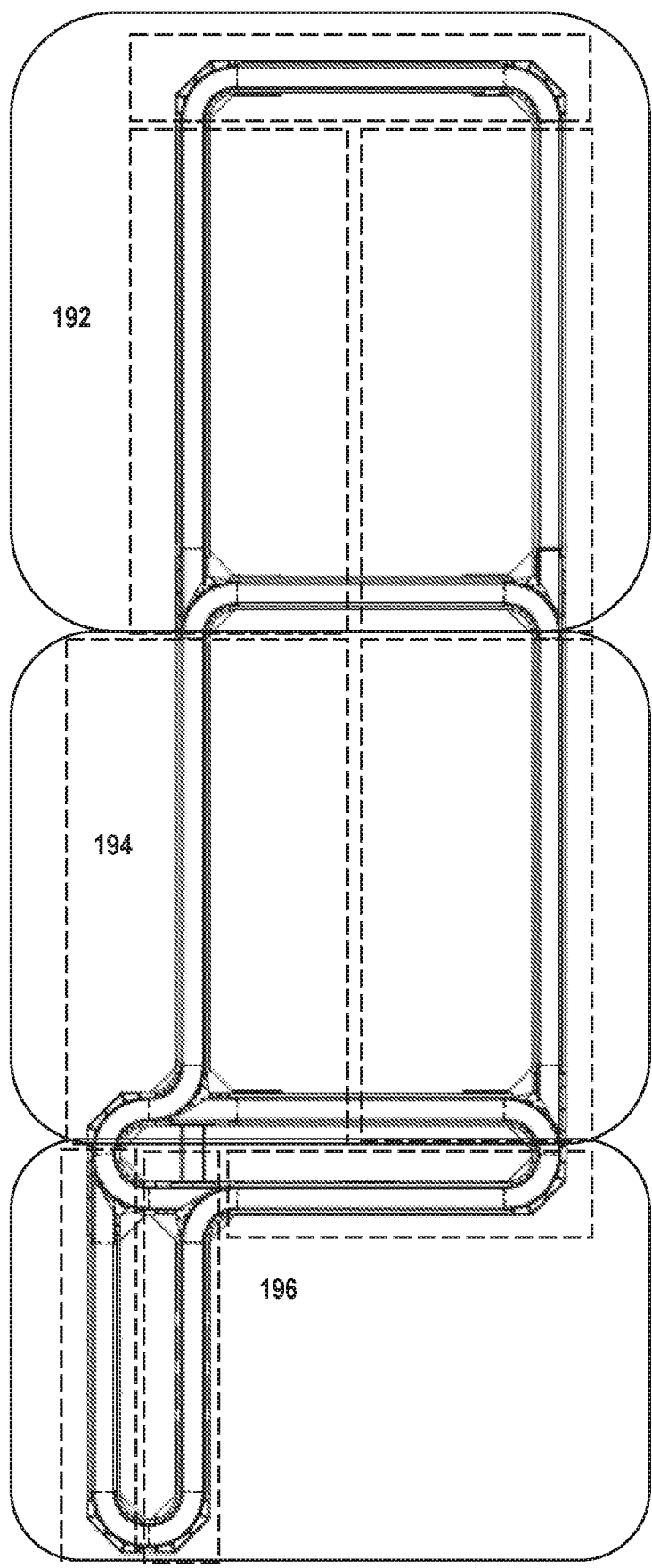
FIG. 3 shows the various control zones for a vessel mover controller controlling track, as may be used in some embodiments.

FIG. 3 shows the various control zones for a vessel mover controller controlling track 160, as may be used in some embodiments. The track system can be divided into different regions, roughly corresponding to each module within the system. For example, with reference to FIG. 3, assume that regions 192 correspond to analyzer module 34 and region 194 corresponds to analyzer module 32. Furthermore, assume that region 196 corresponds to sample handler 10.

Continuing with reference to FIG. 3, redundancy can be accomplished by assigning a PFS to be in charge of providing network and power to each of these regions. Each PFS switch provides power to the local region of track. In this example, the PFS switch for region 196 accesses a local power source to provide power to this region. That PFS switch also provides a power channel that may be accessed in the adjacent PFS switch for region 194. The PFS switch for region 194 has normal access to a local power source provided by the local analyzer module 32. Should that local analyzer module 32 fail, be turned off, or need servicing, that power supply can be interrupted. However, it is desirable to still allow the analyzer module 34 in region 192 to operate while the analyzer module 32 in 194 is being serviced. Thus, the track sections in region 192 and 194 need to continue to operate. To accomplish this, the PFS switch for region 194 detects the loss of power from the local analyzer module 32 and accesses the power feed supplied by the adjacent PFS switch from region 196. The PFS switch for region 194, in turn, provides a power feed to the PFS switch for region 192, should that section need power when local analyzer module's 34 power fails. Should the analyzer module 34 in region 192 lose power, such that the PFS switch for region 192 cannot access the local power feed, that PFS switch can detect the loss of local power and access the power feed supplied by the PFS switch for adjacent region 194. In this manner, should the analyzer module in region 192 or 194 fail, local track sections continue to get power supplied by the power source for the module in the adjacent region.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes, and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A modular in vitro diagnostics (IVD) vessel mover system providing redundant power management, the system comprising:
   a plurality of modules configured to provide storage to one or more IVD samples, each module comprising a power failover switch configured to:
      receive internal power from an internal primary power source, and
      transmit backup power to one or more of the plurality of modules,
   wherein the plurality of modules comprise a central module and one or more non-central modules, the power failover switch of the central module further configured to:
      receive additional internal power from an internal independent backup power source,
   wherein the central module further comprises:
      a port coupled to the internal independent backup power source and configured to transmit power to one or more of the non-central modules without utilizing the power failover switch of the central module.

2. The system of claim 1, wherein the power failover switch of each of the non-central modules is further configured to receive backup power from one or more of the plurality of modules.

3. The system of claim 2, wherein the power failover switch of each non-central module is further configured to:
   utilize power received from the internal primary power source of the non-central module to perform one or more powered functions in the non-central module; and
   in response to detecting a power fault condition in the internal primary power source, switch to utilization of the backup power received from the one or more of the plurality of modules to perform the one or more powered functions in the non-central module.

4. A modular in vitro diagnostics (IVD) vessel mover system providing redundant power management, the system comprising:
   a plurality of modules configured to provide storage to one or more IVD samples, each module comprising a power failover switch configured to:
      receive internal power from an internal primary power source, and
      transmit backup power to one or more of the plurality of modules,
   wherein the plurality of modules comprise a central module and one or more non-central modules, the power failover switch of the central module further configured to:
      receive additional internal power from an internal independent backup power source,
      utilize power received from the internal primary power source of the central module to perform one or more powered functions in the central module, and
      in response to detecting a power fault condition in the internal primary power source, switch to utilization of power received from the internal independent backup power source of the central module to perform the one or more powered functions in the central module,
   wherein the one or more powered functions comprise operating a cooling unit of the central module.

5. The system of claim 4, wherein the power failover switch of the central module is further configured to:
   in response to detecting that the power fault condition in the internal primary power source has ended, switch to utilization of power received from the internal primary power source of the central module to perform the one or more powered functions in the central module.

6. The system of claim 4, wherein the one or more powered functions comprise operating a transportation unit of the central module.

7. The system of claim 4, wherein the power failover switch of each of the non-central modules is further configured to receive backup power from one or more of the plurality of modules.

8. The system of claim 7, wherein the power failover switch of each non-central module is further configured to:
   utilize power received from the internal primary power source of the non-central module to perform one or more powered functions in the non-central module; and
   in response to detecting the power fault condition in the internal primary power source, switch to utilization of the backup power received from the one or more of the plurality of modules to perform the one or more powered functions in the non-central module.

9. A modular in vitro diagnostics (IVD) vessel mover system providing redundant power management, the system comprising:
 a plurality of modules configured to provide storage to one or more IVD samples, each module comprising a power failover switch configured to:
  receive internal power from an internal primary power source, and
  transmit backup power to one or more of the plurality of modules,
 wherein the plurality of modules comprise a central module and one or more non-central modules, the power failover switch of the central module further configured to:
  receive additional internal power from an internal independent backup power source,
 wherein the power failover switch of each non-central module is further configured to:
  receive backup power from one or more of the plurality of modules,
  utilize power received from the internal primary power source of the non-central module to perform one or more powered functions in the non-central module,
  in response to detecting a power fault condition in the internal primary power source, switch to utilization of the backup power received from the one or more of the plurality of modules to perform the one or more powered functions in the non-central module, and
  in response to detecting that the power fault condition in the internal primary power source has ended, switch to utilization of power received from the internal primary power source of the non-central module to perform the one or more powered functions in the non-central module.

10. A modular in vitro diagnostics (IVD) vessel mover system providing redundant power management, the system comprising:
 a plurality of modules configured to provide storage to one or more IVD samples, each module comprising a power failover switch configured to:
  receive internal power from an internal primary power source, and
  transmit backup power to one or more of the plurality of modules,
 wherein the plurality of modules comprise a central module and one or more non-central modules, the power failover switch of the central module further configured to:
 receive additional internal power from an internal independent backup power source,
 wherein the power failover switch of each of the non-central modules is further configured to:
  receive backup power from one or more of the plurality of modules,
  utilize power received from the internal primary power source of the non-central module to perform one or more powered functions in the non-central module, and
  in response to detecting a power fault condition in the internal primary power source, switch to utilization of the backup power received from the one or more of the plurality of modules to perform the one or more powered functions in the non-central module,
 wherein the one or more powered functions comprise operating a cooling unit of the non-central module.

11. The system of claim 10, wherein the one or more powered functions comprise operating a transportation unit of the non-central module.

* * * * *